(12) United States Patent
Mochizuki et al.

(10) Patent No.: US 11,525,498 B2
(45) Date of Patent: Dec. 13, 2022

(54) SCREW DEVICE

(71) Applicant: THK CO., LTD., Tokyo (JP)

(72) Inventors: Kazuyoshi Mochizuki, Tokyo (JP); Tetsuya Miura, Tokyo (JP); Ryuji Muramatsu, Tokyo (JP); Yusuke Todoroki, Tokyo (JP)

(73) Assignee: THK CO., LTD., Tokyo (JP)

( * ) Notice: Subject to any disclaimer, the term of this patent is extended or adjusted under 35 U.S.C. 154(b) by 50 days.

(21) Appl. No.: 17/258,232

(22) PCT Filed: Jun. 19, 2019

(86) PCT No.: PCT/JP2019/024200
§ 371 (c)(1),
(2) Date: Jan. 6, 2021

(87) PCT Pub. No.: WO2020/012894
PCT Pub. Date: Jan. 16, 2020

(65) Prior Publication Data
US 2021/0277984 A1    Sep. 9, 2021

(30) Foreign Application Priority Data

Jul. 10, 2018 (JP) .............................. JP2018-130811

(51) Int. Cl.
*F16H 25/20* (2006.01)
*F16H 25/22* (2006.01)
(Continued)

(52) U.S. Cl.
CPC ......... *F16H 25/2015* (2013.01); *F16H 25/20* (2013.01); *F16H 25/2214* (2013.01);
(Continued)

(58) Field of Classification Search
CPC ................ F16H 25/2214; F16H 57/01; F16H 2057/012; F16H 57/0497; G01B 7/148; G01B 7/146; G01B 7/144
See application file for complete search history.

(56) References Cited

U.S. PATENT DOCUMENTS 7,299,703 B2 * 11/2007 Balasu .................... F16H 57/01
                                                                73/810
7,930,949 B2 *  4/2011 Singh ..................... F16H 25/20
                                                                74/424.82
(Continued)

FOREIGN PATENT DOCUMENTS

JP       2876614 B      3/1999
JP     2004-12209      1/2004
(Continued)

OTHER PUBLICATIONS

International Search Report for PCT/JP2019/024200, dated Sep. 3, 2019, 2 pages.
(Continued)

*Primary Examiner* — Jake Cook
*Assistant Examiner* — Gregory Robert Weber
(74) *Attorney, Agent, or Firm* — Nixon & Vanderhye (57) ABSTRACT

A screw device is provided which can detect damage to a groove of a screw shaft, the damage being hidden by a nut, with a high probability. At least two circulation components are mounted on a nut in such a manner as to form at least two circulation circuits that circulate rolling elements. The nut is provided with a sensor that detects a displacement of a groove of a screw shaft between the adjacent circulation circuits.

8 Claims, 5 Drawing Sheets

(51) Int. Cl.
*F16H 57/01* (2012.01)
*G01B 7/14* (2006.01)

(52) U.S. Cl.
CPC .............. *F16H 57/01* (2013.01); *G01B 7/148* (2013.01); *F16H 2057/012* (2013.01)

(56) References Cited

U.S. PATENT DOCUMENTS

| | | | | |
|---|---|---|---|---|
| 9,188,164 | B2* | 11/2015 | Huag | F16C 41/007 |
| 9,194,477 | B2* | 11/2015 | Lee | F16H 25/2214 |
| 10,767,741 | B1* | 9/2020 | Liu | F16H 25/2015 |
| 2009/0071278 | A1* | 3/2009 | Chiu | F16H 25/2204 74/424.82 |

FOREIGN PATENT DOCUMENTS

| | | | |
|---|---|---|---|
| JP | 2004012209 A | * | 1/2004 |
| JP | 2007-333195 A | | 12/2007 |
| JP | 2008-144938 A | | 6/2008 |
| JP | 2009-74982 | | 4/2009 |
| JP | 2009074982 A | * | 4/2009 |
| JP | 2014-114944 | | 6/2014 |
| JP | 2014114944 A | * | 6/2014 |
| JP | 2017-150502 A | | 8/2017 |
| TW | 201525315 A | | 7/2015 |

OTHER PUBLICATIONS

Written Opinion of the ISA for PCT/JP2019/024200, dated Sep. 3, 2019, 4 pages.
Office Action issued in Taiwanese Patent Application No. 108122145 dated Jun. 11, 2022.
Office Action issued in Japanese Patent Application No. 2018-130811 dated Sep. 6, 2022.

* cited by examiner

SCREW DEVICE

This application is the U.S. national phase of International Application No. PCT/JP2019/024200 filed 19 Jun. 2019, which designated the U.S. and claims priority to JP Patent Application No. 2018-130811 filed 10 Jul. 2018, the entire contents of each of which are hereby incorporated by reference.

TECHNICAL FIELD

The present invention relates to a screw device that can detect damage such as exfoliation of a groove of a screw shaft.

BACKGROUND ART

A screw device includes a screw shaft, a nut, and rolling elements such as balls disposed between the screw shaft and the nut. A groove is formed on the screw shaft. A groove facing the groove of the screw shaft is formed on the nut. The rolling elements are disposed in a rollable manner between the groove of the screw shaft and the groove of the nut. A circulation component such as a return pipe is mounted on the nut. The mounting of the circulation component on the nut allows forming, in the screw device, a circulation circuit that circulates the rolling elements.

The screw device is used as a mechanical element that translates rotary motion into linear motion. When one of the screw shaft and the nut is rotated, the other of the screw shaft and the nut performs linear motion. If the screw device is used for, for example, an injection molding machine or pressing machine, a heavy axial load acts on the screw device. If the screw device is used for a long period of time under an environment where a heavy axial load acts on the screw device, damage such as exfoliation may occur on the surface of the groove of the screw shaft. This is because the rolling elements roll repeatedly on the surface of the groove of the screw shaft.

Patent Literature 1 discloses a screw device on which a sensor that detects a displacement of a groove of a screw shaft is mounted on a nut, as a screw device that detects damage to the groove of the screw shaft. When one of the screw shaft and the nut is rotated in the invention described in Patent Literature 1, the sensor moves in the helical direction along the groove above the screw shaft. If damage such as exfoliation occurs on the groove of the screw shaft, the distance between the groove of the screw shaft and the sensor changes. Hence, when the sensor passes over the damage, the output value of the sensor changes. Therefore, the damage of the groove of the screw shaft can be detected.

CITATION LIST

Patent Literature

Patent Literature 1: JP 2004-12209 A

SUMMARY OF INVENTION

Technical Problem

However, in the invention of Patent Literature 1, the sensor is provided at an end of the nut in the axial direction. The sensor detects a displacement of the groove outside a circulation circuit of the screw shaft. Hence, there is a problem that especially if the stroke of the nut or screw shaft in the axial direction is short, it is difficult to detect damage to the groove of the screw shaft, the damage being hidden by the nut. Damage to this portion, which is hidden by the nut, is difficult to be visually observed.

Hence, an object of the present invention is to provide a screw device that can detect damage to a groove of a screw shaft, the damage being hidden by a nut, with a high probability.

Solution to Problem

In order to solve the above problem, one aspect of the present invention is a screw device including: a screw shaft having a groove; a nut having a groove facing the groove of the screw shaft; at least two circulation components mounted on the nut in such a manner as to form at least two circulation circuits; a plurality of rolling elements housed in the at least two circulation circuits; and a sensor provided to the nut, the sensor being configured to detect a displacement of the groove of the screw shaft between the adjacent circulation circuits.

Advantageous Effects of Invention

According to the present invention, the at least two circulation circuits are formed in the screw device, and the sensor detects a displacement of the groove of the screw shaft between the adjacent circulation circuits. Accordingly, it is possible to detect damage to the groove of the screw shaft, the damage being hidden by the nut, with a high probability.

DESCRIPTION OF EMBODIMENTS

A screw device according to embodiments of the present invention is described in detail hereinafter with reference to the accompanying drawings. However, the screw device of the present invention can be embodied in various forms, and is not limited to the embodiments described in the present description. The embodiments are provided with the intention of allowing those skilled in the art to fully understand the scope of the invention by fully disclosing the description.

First Embodiment

Figure 1:
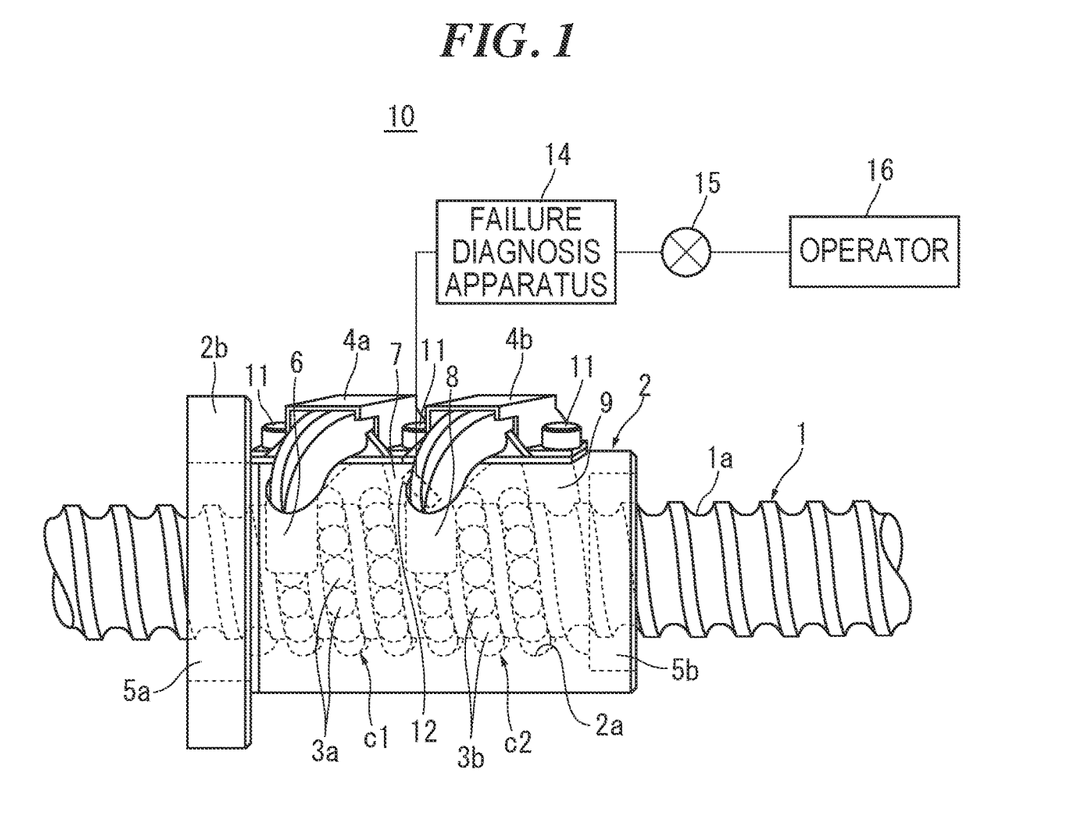
FIG. 1 is a side view of a screw device according to a first embodiment of the present invention.

FIG. 1 illustrates a side view of a screw device 10 according to a first embodiment of the present invention. A reference sign 1 denotes a screw shaft, a reference sign 2 a nut, reference signs 3*a* and 3*b* balls as rolling elements disposed between the screw shaft and the nut, and reference signs 4a and 4b return pipes as circulation components.

A helical groove 1a is formed in an outer surface of the screw shaft 1. The groove 1a has a Gothic arch shape in cross-section. The balls 3a and 3b perform rolling motion in the helical direction on the groove 1a.

The nut 2 is assembled to the screw shaft 1 via the balls 3a and 3b. The nut 2 has a cylindrical shape. A flange 2b for mounting the nut 2 on a counterpart component is formed at one end of the nut 2 in the axial direction. A helical groove 2a facing the groove 1a of the screw shaft 1 is formed in an inner surface of the nut 2. The groove 2a has a Gothic arch shape in cross-section. The balls 3a and 3b perform rolling motion in the helical direction on the groove 2a. Reference signs 5a and 5b denote sealing devices mounted at ends of the nut 2 in the axial direction.

At least two circulation components 4a and 4b (two circulation components 4a and 4b in FIG. 1) are mounted on the nut 2. The circulation components 4a and 4b are pipe-type circulation components obtained by bending pipes into a U-shape. One end 6 and the other end 7 of the circulation component 4a are inserted into through-holes provided in the nut 2. The one end 6 and the other end 7 of the circulation component 4a are connected to one end and the other end of the groove 2a of the nut 2. Similarly, one end 8 and the other end 9 of the circulation component 4b are inserted into through-holes provided in the nut 2, and connected to one end and the other end of the groove 2a of the nut 2. The circulation components 4a and 4b are mounted on the nut 2 with fastening members 11 such as screws. The circulation components 4a and 4b are placed on the nut 2, displaced from each other in the axial direction.

The mounting of the circulation components 4a and 4b on the nut 2 allows forming circulation circuits c1 and c2 in the screw device 10. Pluralities of the balls 3a and 3b are housed in the circulation circuits c1 and c2. Each of the circulation circuits c1 and c2 includes a loaded path between the groove 1a of the screw shaft 1 and the groove 2a of the nut 2, and a no-load path in each of the circulation components 4a and 4b. The ball 3a that has rolled to one end of the groove 2a of the nut 2 is scooped by the one end 6 of the circulation component 4a, passes through the no-load path in the circulation component 4a, and then returns some turns back to the other end of the groove 2a of the nut 2 from the other end 7 of the circulation component 4a. The same applies to the circulation circuit c2.

In the example of FIG. 1, the two circulation circuits c1 and c2 are formed, displaced in the axial direction, in the groove 2a of the single-start nut 2. However, it is also possible to form three or more circulation circuits, or form two or more circulation circuits in the grooves of the double-start nut 2, displaced from each other in the axial direction.

As illustrated in FIG. 1, a sensor 12 is placed between the adjacent circulation circuits c1 and c2 of the nut 2. If the sensor 12 is placed in the circulation circuit c1 or c2, the sensor 12 collides with the ball 3a or 3b. Hence, the sensor 12 is placed between the adjacent circulation circuits c1 and c2 outside the circulation circuits c1 and c2. The sensor 12 is not placed at the end of the nut 2 in the axial direction.

The sensor 12 is an eddy current displacement sensor. The sensor 12 detects a displacement of the groove 1a of the screw shaft 1, that is, the distance between the sensor 12 and the groove 1a of the screw shaft 1. As the distance between the sensor 12 and the groove 1a decreases, an eddy current loss increases while the oscillation amplitude is reduced. The sensor 12 rectifies the oscillation amplitude and outputs direct current voltage. The rectified direct current voltage and the distance are substantially proportional. Hence, it is possible to detect the distance between the sensor 12 and the groove 1a on the basis of the direct current voltage outputted by the sensor 12.

If damage such as exfoliation of the groove 1a of the screw shaft 1 (separation of the surface of the groove 1a), and a biting flaw (a flaw caused by biting foreign matter between the groove 1a and the ball 3a or 3b) occurs, the direct current voltage outputted by the sensor 12 changes when the sensor 12 passes over the damage. Hence, it is possible to detect the damage to the groove 1a. The direct current voltage outputted by the sensor 12 is converted to digital displacement information by an unillustrated amplification unit or IC circuit of the sensor 12.

The displacement information outputted by the sensor 12 is inputted into a failure diagnosis apparatus 14. The failure diagnosis apparatus 14 is a computer including a CPU, ROM, RAM, memory, and interface. The failure diagnosis apparatus 14 judges the presence or absence of damage by comparing the displacement information outputted by the sensor 12 with a predetermined threshold. The failure diagnosis apparatus 14 can judge the presence or absence of damage by machine learning the displacement information of the sensor 12, or can judge the presence or absence of damage by deep learning (deep learning) the displacement information of the sensor 12 by means of artificial intelligence. If damage occurs, the failure diagnosis apparatus 14 notifies an operator 16 of the occurrence of the damage via communication means 15 such as a LAN or Internet line.

The failure diagnosis apparatus 14 can also be placed near the screw device 10 or on a cloud. In other words, it is also possible to introduce the IoT, cause a transmitter to transmit the displacement information of the sensor 12 to the cloud via the communication means 15 such as a LAN or Internet line, and cause the failure diagnosis apparatus 14 provided on the cloud to judge the presence or absence of damage.

Figure 2A:
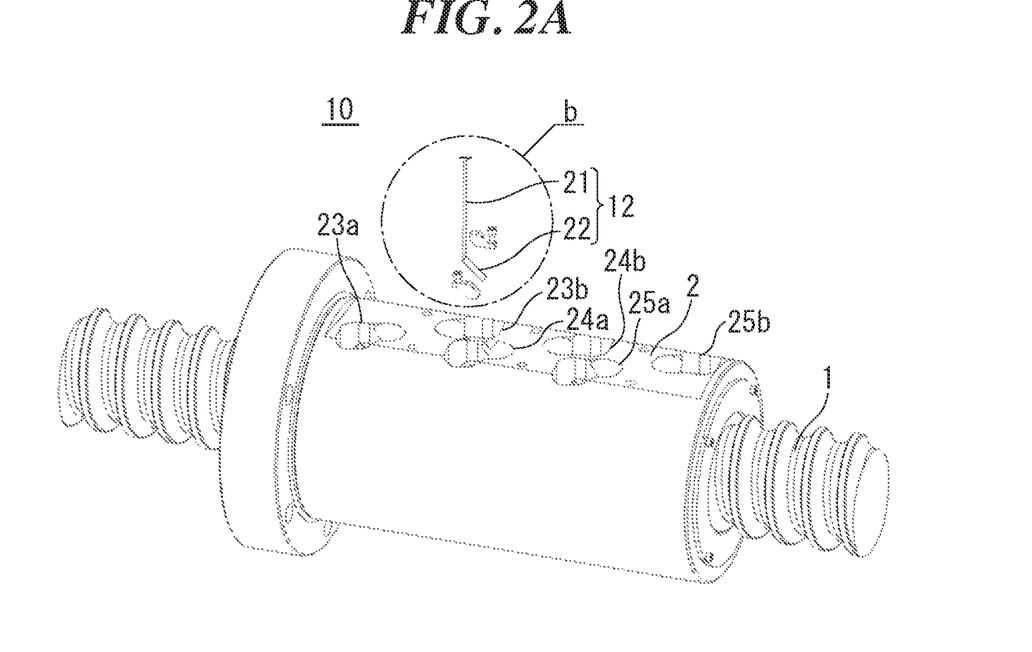
FIG. 2A is a perspective view of the screw device according to the embodiment from which circulation components have been removed.
Figure 2B:
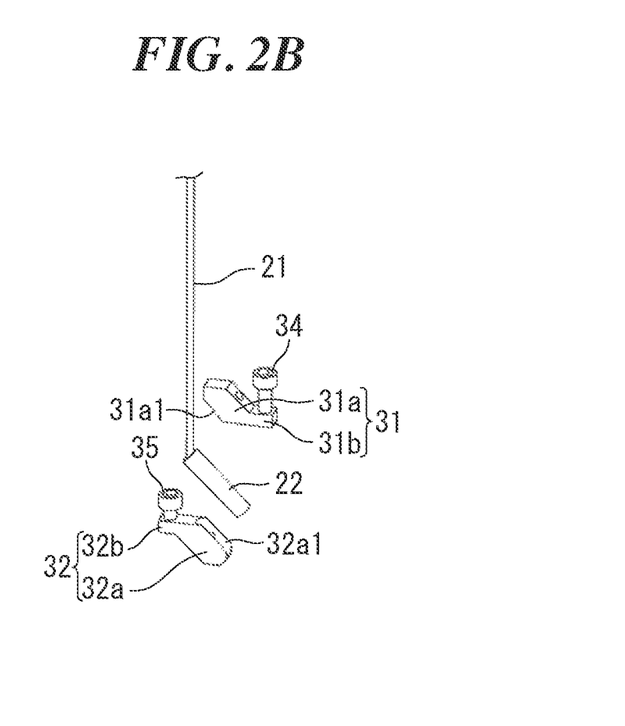
FIG. 2B is an enlarged view of a part b in FIG. 2A.
Figure 3A:
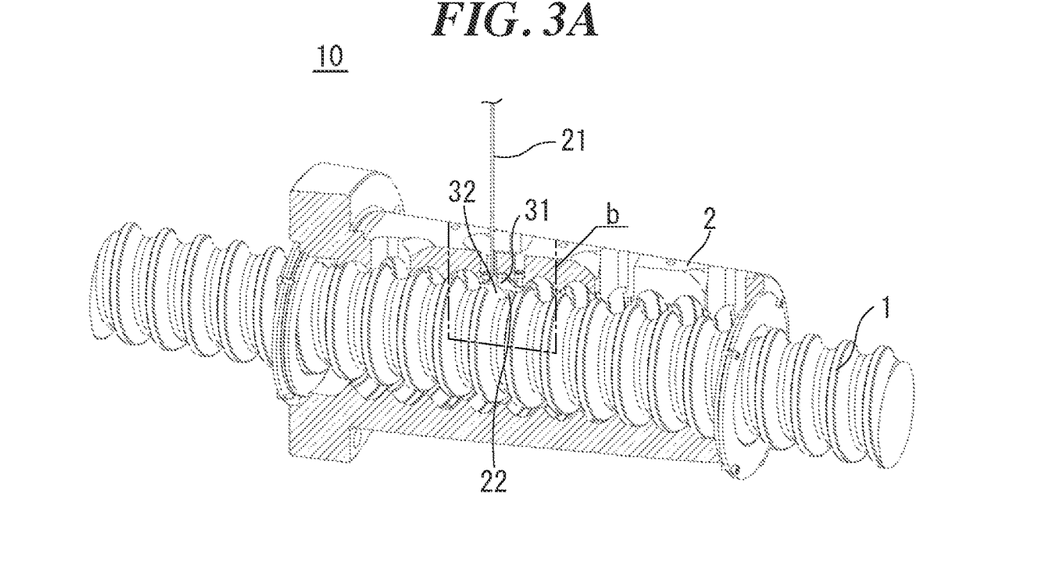
FIG. 3A is a perspective view of the screw device according to the embodiment where a sensor is mounted.
Figure 3B:
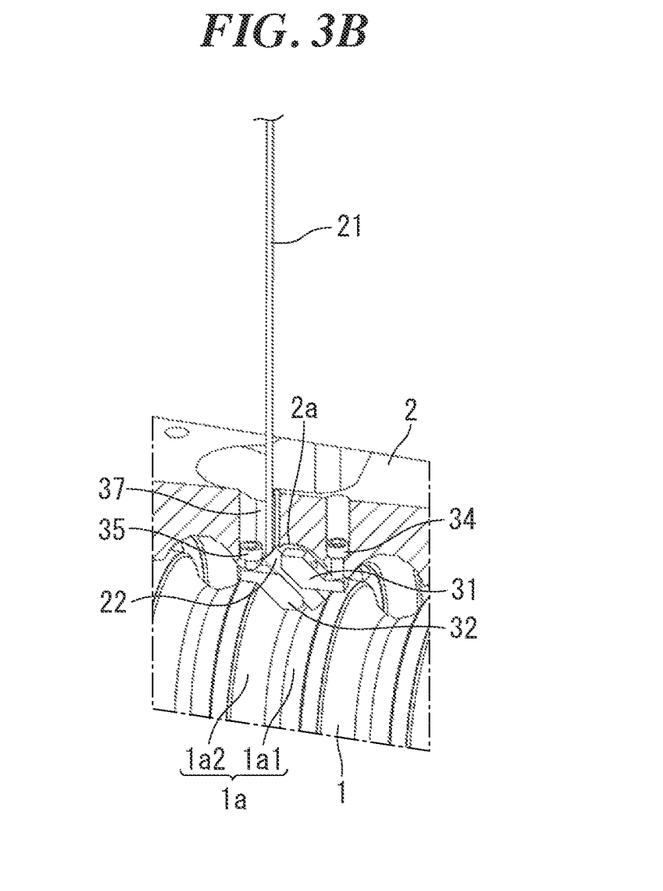
FIG. 3B is an enlarged view of a part b in FIG. 3A.

FIG. 2 is an exploded perspective view of the screw device 10. FIG. 3 is a perspective view of the screw device 10 where the sensor 12 is mounted. A reference sign 21 denotes a cord of the sensor 12, a reference sign 22 a head of the sensor 12, a reference sign 31 a first holder, and a reference sign 32 a second holder. The through-holes where both ends of the circulation components are inserted are formed in the nut 2. FIG. 2 illustrates six through-holes 23a, 23b, 24a, 24b, 25a, and 25b in the nut 2. Three circulation components are mounted on the nut 2 in FIG. 2. The sensor 12 is placed between the adjacent circulation circuits of the nut 2.

As illustrated in FIG. 3B, the head 22 is placed between the groove 1a of the screw shaft 1 and the groove 2a of the nut 2. The head 22 is pointed toward one wall surface 1a1 of the groove 1a, and detects a displacement of the one wall surface 1a1. The groove 1a of the screw shaft 1 has two wall surfaces 1a1 and 1a2. If an injection molding machine or pressing machine uses the screw device 10, a heavy axial load acts mainly on the one wall surface 1a1 of the groove 1a of the screw shaft 1. Hence, the head 22 is simply required to detect a displacement of the one wall surface 1a1 of the screw shaft 1.

As illustrated in FIG. 2B, the first holder 31 has a plate shape, and includes a body portion 31a and an extension portion 31b. A substantially semicylindrical holding surface 31a1 whose shape is adjusted to the head 22 is formed on the body portion 31a. A screw hole that is threadedly engaged with a fastening member 34 such as a screw for mounting the first holder 31 on the nut 2 is formed in the extension portion 31b. The second holder 32 has substantially the same shape as the first holder 31, which is the shape of the vertically inverted first holder 31. The second holder 32 also includes a body portion 32a and an extension portion 32b as in the first holder 31. A substantially semicylindrical holding surface 32a1 whose shape is adjusted to the head 22 is formed on the body portion 32a.

As illustrated in FIG. 3B, the first holder 31 and the second holder 32 are mounted on the inner surface of the nut 2 with the fastening member 34 and a fastening member 35. In a state of being mounted on the inner surface of the nut 2, the extension portion 31b of the first holder 31 is in contact with the ridge of the nut 2, and the body portion 31a is in the groove 2a of the nut 2. Similarly, the extension portion 32b of the second holder 32 is in contact with the ridge of the nut 2, and the body portion 32a is in the groove 1a of the screw shaft 1. The head 22 is sandwiched between the first holder 31 and the second holder 32. The head 22 is fixed with an adhesive by the first holder 31 and the second holder 32. The cord 21 of the sensor 12 is taken out of the nut 2 through a through-hole 37 between the circulation circuits of the nut 2.

Up to this point the configuration of the screw device 10 according to the embodiment has been described. The screw device 10 according to the embodiment has the following effects:

At least two circulation circuits c1 and c2 are formed in the screw device 10. The sensor 12 detects a displacement of the groove 1a of the screw shaft 1 between the adjacent circulation circuits c1 and c2. Accordingly, it is possible to detect damage to the groove 1a of the screw shaft 1, the damage being hidden by the nut 2, with a high probability.

The sensor 12 is placed between the adjacent circulation circuits c1 and c2 of the nut 2. Accordingly, it is possible to make the nut 2 compact.

The sensor 12 is sandwiched between the first holder 31 mounted on the inner surface of the nut 2 and the second holder 32 mounted on the inner surface of the nut 2. Accordingly, it is possible to mount the sensor 12 on the nut 2 without making a large through-hole where the sensor 12 is placed, between the circulation circuits c1 and c2 of the nut 2.

The sensor 12 is an eddy current displacement sensor. Accordingly, it is possible to detect a displacement of the groove 1a of the screw shaft 1 without being influenced by a lubricant on the groove 1a of the screw shaft 1.

Second Embodiment

Figure 4:
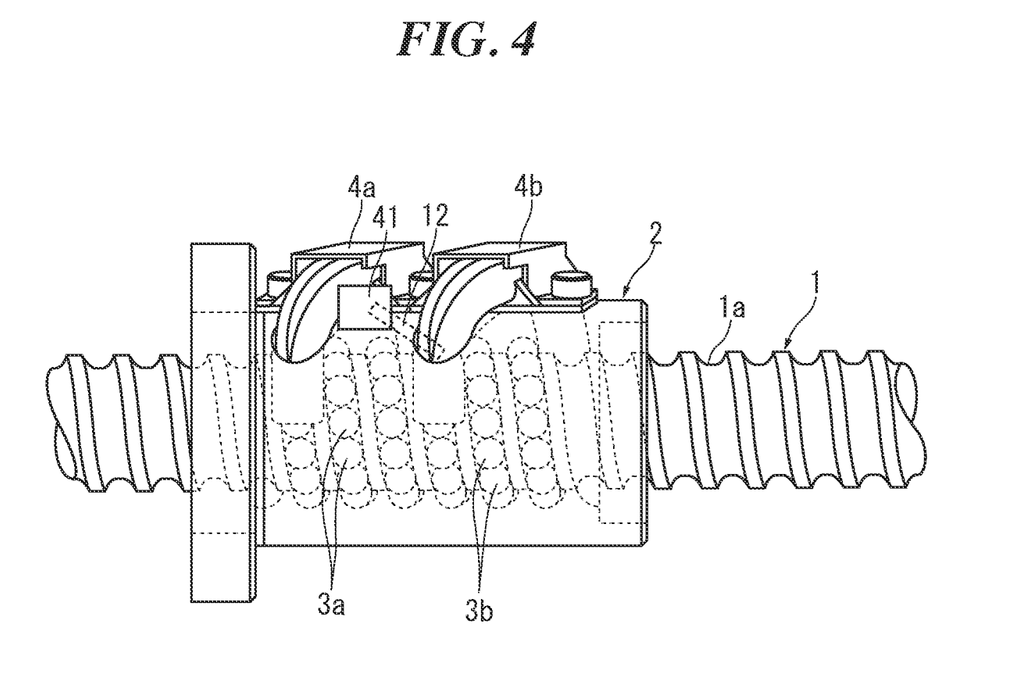
FIG. 4 is a side view of a screw device according to a second embodiment of the present invention.

FIG. 4 illustrates a side view of a screw device according to a second embodiment of the present invention. A reference sign 1 denotes a screw shaft, a reference sign 2 a nut, reference signs 3a and 3b balls as rolling elements, reference signs 4a and 4b return pipes as circulation components, and a reference sign 12 a sensor. The configurations of the screw shaft 1, the nut 2, the balls 3a and 3b, the circulation components 4a and 4b, and the sensor 12 are the same as in the first embodiment. Accordingly, the same reference signs are assigned to the screw shaft 1, the nut 2, the balls 3a and 3b, the circulation components 4a and 4b, and the sensor 12, and descriptions thereof are omitted.

The sensor 12 is sandwiched between the first holder 31 and the second holder 32 in the first embodiment, while a holding portion 41 that holds the sensor 12 is mounted on the circulation component 4a in the second embodiment.

Figure 5:
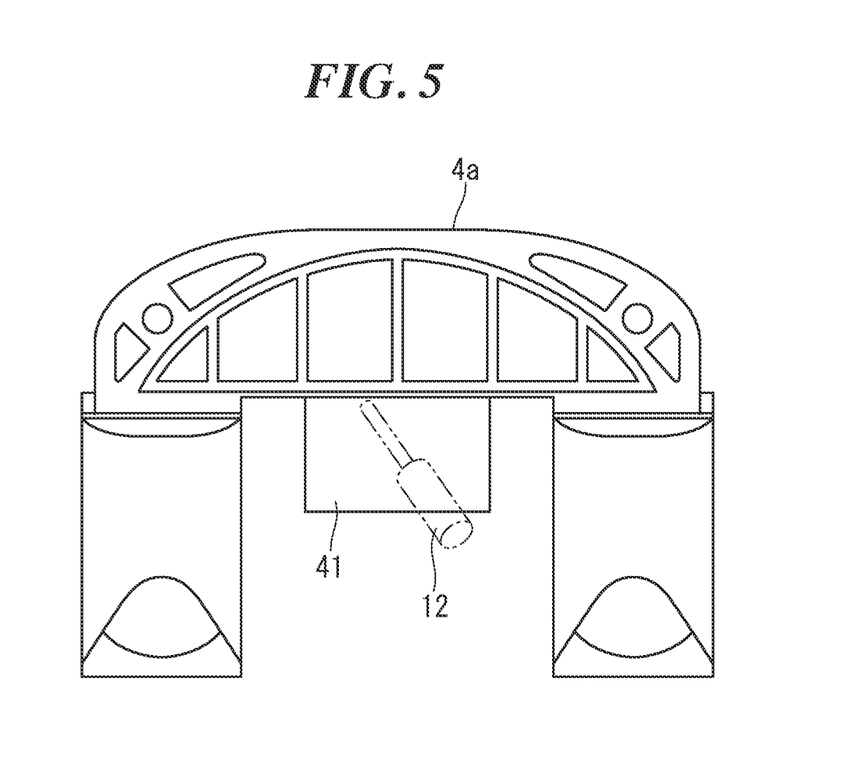
FIG. 5 is a side view of a circulation component of the screw device according to the second embodiment of the present invention.

FIG. 5 illustrates a side view of the circulation component 4a. The belly (the middle portion) of the circulation component 4a is provided with the holding portion 41. The holding portion 41 can be formed integrally with the circulation component 4a by, for example, resin molding, or can be mounted on the circulation component 4a with a fastening member. The holding portion 41 holds the sensor 12. A hole whose shape is adjusted to the holding portion 41 is made in the nut 2. The holding portion 41 is fitted in this hole in the nut 2. The circulation component 4a can be attached to and detached from the nut 2 by the fastening member. The sensor 12, together with the circulation component 4a, can be attached to and detached from the nut 2. The sensor 12 detects a displacement of the groove 1a of the screw shaft 1, which is the same as in the first embodiment.

According to the screw device of the second embodiment, the holding portion 41 that holds the sensor 12 is mounted on the circulation component 4a. Accordingly, it is possible to easily mount the sensor 12 on the nut 2.

The present invention is not limited to the realization of the above embodiments, and can be modified to other embodiments within the scope that does not change the gist of the present invention.

In the above embodiments, damage such as exfoliation and biting of the screw shaft is detected by the sensor. However, for example, the wearing out and inclination of the screw shaft can also be detected.

In the above embodiments, an eddy current displacement sensor having a cylindrical head is used as the sensor. However, an eddy current displacement sensor where a planar coil and a dedicated IC are mounted on a board can also be used.

In the above embodiments, the sensor is placed between the adjacent circulation circuits of the nut, and the sensor is not placed at an end of the nut in the axial direction. However, it is also possible to place the sensor also at an end of the nut in the axial direction to increase the probability of detecting damage to the groove of the screw shaft.

In the above embodiments, a pipe-type circulation component is used as the circulation component. However, a deflector-type circulation component can also be used. The deflector-type circulation component causes the ball that has rolled to one end of the groove of the nut to climb over the ridge of the screw shaft, and return one turn back to the groove of the nut.

The present description is based on Japanese Patent Application No. 2018-130811 filed on Jul. 10, 2018, the entire contents of which are incorporated herein.

REFERENCE SIGNS LIST

1 Screw shaft
1a Groove of the screw shaft
2 Nut
2a Groove of the nut
3a, 3b Ball (rolling element)
4a, 4b Circulation component
10 Screw device
12 Sensor
31 First holder
32 Second holder
41 Holding portion
c1, c2 Circulation circuit

The invention claimed is:
1. A screw device comprising:
a screw shaft including a groove;
a nut including a groove facing the groove of the screw shaft;

at least two circulation components mounted on the nut in such a manner as to form at least two circulation circuits;

a plurality of rolling elements housed in the at least two circulation circuits; and a sensor provided to the nut, the sensor being configured to detect a displacement of the groove of the screw shaft between the adjacent circulation circuits, wherein the sensor is sandwiched between a first holder and a second holder, the first holder being mounted on an inner surface of the nut and having a body portion that enters the groove of the nut, and the second holder being mounted on the inner surface of the nut and having a body portion that enters the groove of the shaft.

2. The screw device according to claim 1, wherein the sensor is placed between the adjacent circulation circuits of the nut.

3. The screw device according to claim 2, wherein the sensor is an eddy current displacement sensor.

4. The screw device according to claim 1, wherein the sensor is an eddy current displacement sensor.

5. A screw device comprising:
a screw shaft including a groove;
a nut including a groove facing the groove of the screw shaft;
at least two circulation components mounted on the nut in such a manner as to form at least two circulation circuits;
a plurality of rolling elements housed in the at least two circulation circuits; and
a sensor provided to the nut, the sensor being configured to detect a displacement of the groove of the screw shaft between the adjacent circulation circuits,
wherein the sensor is sandwiched between a first holder and a second holder, the first holder being mounted on an inner surface of the nut and having an extension portion that is in direct contact with a top of a ridge of the nut, and the second holder being mounted on the inner surface of the nut and having an extension portion that is in direct contact with a top of the ridge of the nut.

6. The screw device according to claim 5, wherein the sensor is placed between the adjacent circulation circuits of the nut.

7. The screw device according to claim 6, wherein the sensor is an eddy current displacement sensor.

8. The screw device according to claim 5, wherein the sensor is an eddy current displacement sensor.

* * * * *